Sept. 20, 1971  J. J. WETZEL II  3,605,512

EXPANSIBLE PULLEY

Filed Oct. 20, 1969

INVENTOR.
John J. Wetzel II
BY
John P. Moran
ATTORNEY

United States Patent Office 3,605,512
Patented Sept. 20, 1971

3,605,512
EXPANSIBLE PULLEY
John J. Wetzel II, Pontiac, Mich., assignor to
General Motors Corporation, Detroit, Mich.
Filed Oct. 20, 1969, Ser. No. 867,846
Int. Cl. F16h 55/54
U.S. Cl. 74—230.18
8 Claims

ABSTRACT OF THE DISCLOSURE

A molded rubber expansible pulley arrangement wherein the pulley is formed as a shaped endless tube and includes a valve and stem for filling the tube to a predetermined pressure. The pulley may be mounted in a groove on the drive hub or bonded thereto and is compressed for the mounting of a conventional V-belt in a groove formed thereon, thereby serving to continually tension the belt and to automatically continue the tensioning process should the belt stretch.

---

This invention relates generally to accessory drive mechanisms and more particularly to expansible pulley mechanisms therefor.

Heretofore various types of adjustable V-belt mounting systems have been proposed and employed to drive accessory drive mechanisms. While such devices, for the most part, have proved satisfactory, where there is need for a low-cost adjustable V-belt mounting system, the invention provides an improved expansible pulley and belt mechanism wherein the V-belt thereof is continually and automatically tensioned throughout its operational life.

Accordingly, an object of the invention is to provide an improved expansible pulley system which continually and automatically tensions an associated V-belt.

Another object of the invention is to provide an expansible pulley system which includes a pressurized molded and shaped rubber pulley suitable for mounting a V-belt thereon under tension.

A further object of the invention is to provide an expansible pulley system wherein a pressurized molded rubber pulley having an exterior V-shape formed thereon may be either mounted in a groove formed on a drive hub and retained therein under pressure without slippage, or bonded to the outer periphery thereof.

These and other objects and advantages of the invention will become more apparent when reference is made to the following specification and accompanying drawings, wherein.

Figure 1:
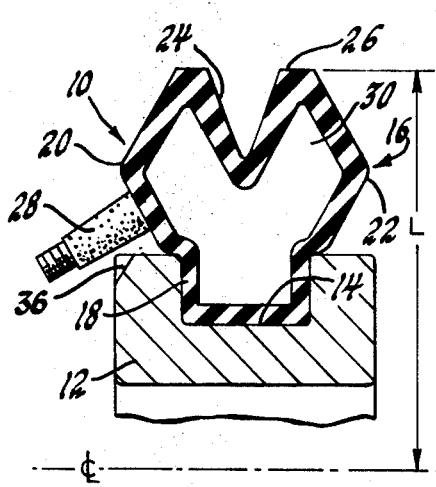
FIG. 1 is a fragmentary cross-sectional view of a drive hub embodying the invention.

Referring now to the drawings in greater detail, FIG. 1 illustrates a pulley mechanism 10 including a fixed, one-piece drive hub or wheel 12 having a circumferential groove 14 formed on the outer periphery thereof. A rubber, endless tube 16 is formed by molding to include a radially inwardly extending flange-like portion 18 which is sized to fit snugly in the groove 14. The molded rubber tube 16 is further formed to include oppositely disposed, convex V-shaped side walls 20 and 22 and a concave V-groove 24 in an outer circumferential wall 26, in order to serve as a pulley as hereinafter described.

A pressurizing valve and valve stem assembly 28 is mounted on one of the side walls 20 or 22 and is used to fill a central chamber 30 with air to a predetermined pressure. Once under such pressure, the flange portion 18 of the tube 16 will be held against the walls of the groove 14 without slippage.

Figure 2:
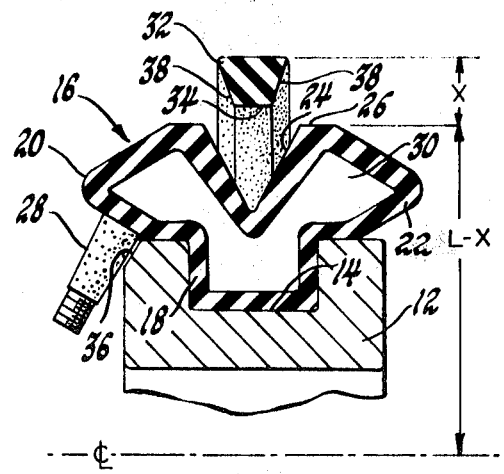
FIG. 2 is a fragmentary cross-sectional view of an operational feature of the invention.

Additionally, once the molded rubber tube 16 is mounted on the drive hub 12 so that the inner flange portion 18 thereof fits in the groove 14, and the central chamber 30 is pressurized via the valve-and-stem 28, the free expanded outermost surface position is at some radius L. Now, as illustrated in FIG. 2, in order to mount a conventional endless drive-transmitting means, such as a V-velt 32 in the V-groove 24 of the outer wall 26, the upper portion of the resilient tube or pulley 16 is flattened or compressed through some radial distance X such that the inner surface 34 of the V-belt 32 may be mounted past the outer wall surface 26, now positioned at a radius L-X.

The drive hub 12 may include an angular slot or groove 36 to prevent interference between the valve stem 28 and the outer edge of the hub 12 during the compression of the pulley 16.

It is important that the V-belt 32 is initially of a size that, once positioned above the V-groove 24, when the pressurized pulley 16 is released, the latter will not be able to return to the original position illustrated in FIG. 1, but, rather, will remain under some compression as determined by the mating sloped surfaces 24 and 38 of the pulley 16 and the V-belt 32, respectively, and will serve to urge the belt 32 outwardly. It is by virtue of this predetermined continued compression that the V-belt 32 may thereafter be continually and automatically tensioned by the resilient tube 16, even if the belt 32 should stretch during its operational lifetime.

The slopes of the V-groove 24 are predetermined so as to substantially match the mating slopes of the sides 38 of the belt 32. However, any variation therebetween is compensated for by the "give" of the walls of the pulley V-groove 24 under the pressure of the conventional V-belt 32. At the same time, the pressure within the central chamber 30 will act on the load-bearing wall formed by the V-groove 24 to cause the sides of the groove 24 to squeeze the walls 38 of the belt 32, thereby tending to prevent slippage of the belt 32 on the annular tubular pulley 16.

It is believed that while the annular pulley 16 remains under compression, it will exert a substantially uniform tension on the belt 32 as the belt 32 stretches and the adjacent portion of the pulley 16 correspondingly expands. It is possible and may be desirable to occasionally inflate the endless tubular pulley 16 to a higher pressure via the valve member 28 as the belt 32 stretches throughout its operational life.

Figure 3:
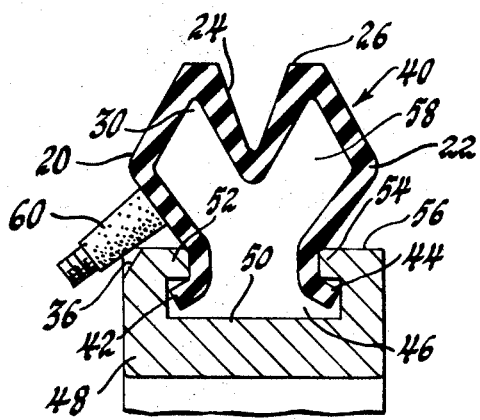
FIGS. 3–6 are fragmentary cross-sectional views of modifications of the invention.

Various modifications of the pressurized molded pulley 16 are illustrated in FIGS. 3–6. Referring to FIG. 3, it may be noted that a pulley 40 is molded to include outwardly extending oppositely disposed collars 42 and 44, with a circumferential opening 46 therebetween. A hub 48 includes a T-shaped external circumferential slot 50 having oppositely disposed rings or annular flanges 52 and 54 formed adjacent the outer peripheral surface 56 thereof. Filling the central chamber 58 with air via the valve-and-stem 60 causes the collars 42 and 44 of the pulley 40 to seal against the flanges 52 and 54, respectively, of the hub 48, thereby preventing both leakage and slippage. Mounting of a V-belt is accomplished in the same manner as was explained above relative to the FIGS. 1 and 2 embodiment.

Figure 4:
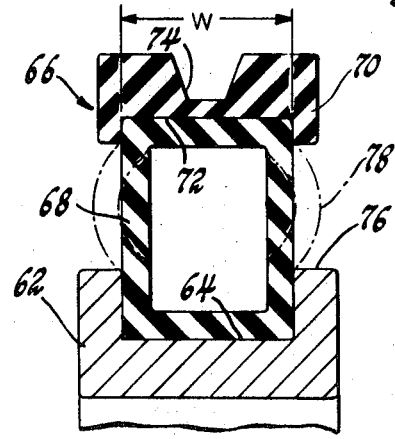

FIG. 4 illustrates a hub 62 including an exterior angular groove 64. A pulley 66 in this embodiment includes a tubular rubber member 68 having a rectangular cross section, the exterior width W of which fits into the groove 64 of the drive hub 62, and a cooperating solid circular rubber member 70. The member 70 includes a straightsided annular groove 72 formed on its inner surface which matches the width W of the member 68, and a tapered annular groove 74 formed on its outer annular surface, the latter being sized to mate with the tapered sides of a conventional V-belt, such as the belt 32 of FIG. 2.

Compressing the pulley 66 to install a V-belt causes the parallel sides of the member 68 to expand outwardly from each other beyond the outer surface 76 of the hub 62, as indicated by the phantom lines identified as 78.

Figure 5:
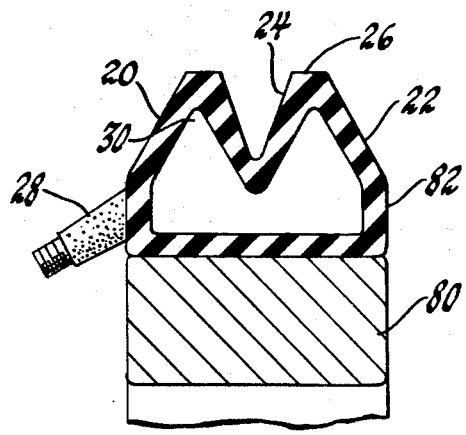

The FIG. 5 embodiment illustrates a hub 80 having a rectangular cross section, and a molded rubber pulley 82 whose I.D. is the same as the hub 80 O.D. and is bonded thereto. Otherwise, the pulley 82 is similar in shape to the pulley 16 of FIG. 1 and bears the same reference numerals.

Figure 6:
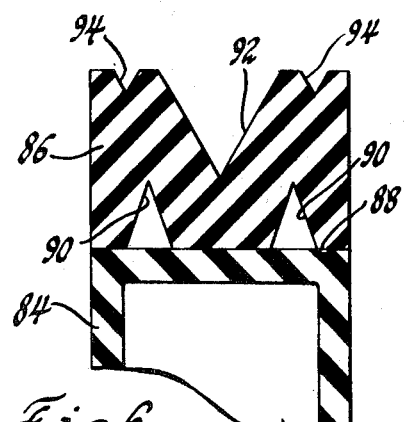

The FIG. 6 structure includes a member 84 which is similar to the member 68 of FIG. 4, and a notched, solid rubber member 86 which is bonded to the outer annular surface 88 of the member 84 adjacent annular relief notches 90. The member 86 includes an exterior annular notch 92 suitable for the mounting of a conventional V-belt having identically sloped sides, and may include additional relief notches 94 adjacent the outer edges of the V-belt notch 92. The members 86 and 70 need not be rubber.

It may be realized that, if desired, any of the pulley members 16, 40, 66, 82 and 88 could be formed to include a plurality of rows of smaller V-grooves on their outer peripheries, similar to the relief notches 94 of FIG. 6, rather than the single V-grooves 24, 74 and/or 92. If such were the case, a typical belt for use therewith would be a flat-type belt having a plurality of spaced, inverted V-shaped ribs formed thereon and matching the rows of smaller V-grooves formed on the pulleys. Additionally, the above pulley members could be formed flat or arced to accommodate a completely flat cross-sectioned belt or a circular cross-sectioned belt, respectively.

It should be apparent that the invention provides an improved expansible pulley arrangement which is highly efficient in its ability to continually tension and grip a V-belt and to automatically adjust to continue the tensioning process should the belt stretch.

While several embodiments of the invention have been shown and described, other modifications thereof are possible.

I claim:

1. An expansible pulley mechanism for an endless drive-transmitting means having oppositely tapered side walls formed thereon, said mechanism comprising a drive wheel, annular pneumatic chamber means mounted on said drive wheel in nonslipping engagement therewith and having flexible freestanding load-bearing side walls formed at the outer periphery of said annular pneumatic chamber means for solely supporting said endless drive-transmitting means at said oppositely tapered side walls thereof in between the outer and inner edges of said load-bearing side walls when said annular pneumatic chamber means is compressed, and thereby retaining said annular pneumatic chamber means in a compressed state and causing the expansion of said side walls thereof adjacent the contacting surfaces of said endless drive transmitting means and said annular pneumatic chamber means, said compressed annular pneumatic chamber means serving to continually tension said endless drive-transmitting means by automatically expanding to compensate for any stretching of said endless drive-transmitting means.

2. The pulley mechanism described in claim 1, wherein an annular groove is formed on the outer periphery of said drive wheel, and an annular flange is formed on the inner periphery of said annular pneumatic chamber means, said annular flange being mounted in said annular groove and being maintained in nonslipping engagement therewith by said internal pressure.

3. The pulley mechanism described in claim 1, wherein a pair of oppositely disposed inwardly extending collars are formed in a groove on the outer periphery of said drive wheel, and a pair of oppositely disposed outwardly extending flanges are formed on the inner periphery of said annular pneumatic chamber means, said flanges being forced against said collars by said pressure, thereby preventing leakage and slippage.

4. The pulley mechanism described in claim 1, wherein an annular groove is formed on the outer periphery of said drive wheel, and said annular pneumatic chamber means includes a hollow tubular member having a rectangular cross section and whose radially inner width fits in said annular groove, and a solid ring member having an inner annular groove, and an outer annular tapered groove, the radially outer width of said hollow tubular member fitting in said inner annular groove and said endless drive-transmitting means being mounted in said outer annular tapered groove.

5. The pulley mechanism described in claim 1, wherein the inner annular surface of said annular pneumatic chamber means is bonded to the outer annular surface of said drive wheel.

6. The pulley mechanism described in claim 1, wherein an annular groove is formed on the outer periphery of said drive wheel, and said annular pneumatic chamber means includes a hollow tubular member having a rectangular cross section and whose radially inner width fits in said annular groove, and a solid ring member whose inner annular surface is bonded to the outer annular surface of said hollow tubular member.

7. The mechanism described in claim 1, wherein said endless drive-transmitting means is a belt having at least one inverted V-shaped rib formed around the inner periphery thereof, and said load-bearing wall having at least one V-shaped groove formed on the outer periphery thereof for receiving said inverted V-shaped rib.

8. A drive device comprising a hub, annular pneumatic chamber means mounted on said hub in nonslipping engagement therewith, an endless belt having at least one inverted V-shaped rib formed around the inner periphery thereof, a load-bearing wall formed on the outer periphery of said annular pneumatic chamber means having side walls and at least one V-shaped groove formed on the outer periphery thereof for receiving said inverted V-shaped rib when said annular pneumatic chamber means is compressed, said endles belt retaining said annular pneumatic chamber means in a compressed state, causing the expansion of said side walls of said annular pneumatic chamber means adjacent the contacting surfaces of said endless belt and said annular pneumatic chamber means, and said endless belt being positioned radially inwardly of the radially outermost portion of said annular pneumatic chamber means and being squeezed between the walls of said V-shaped groove formed on said load-bearing wall to prevent slippage therebetween, said annular pneumatic chamber means serving to continuously tension said endless belt by progressively expanding as required to correspond with any relaxation of said endless belt.

References Cited

UNITED STATES PATENTS

| | | | |
|---|---|---|---|
| 2,119,395 | 5/1938 | Locke | 74—230.18 |
| 2,841,020 | 7/1958 | Deventer | 74—230.01 |
| 2,886,378 | 5/1959 | Anderson | 74—230.7 |
| 3,048,048 | 8/1962 | Weston | 74—230.7 |
| 3,105,536 | 10/1963 | Cappa | 74—230.7 |

C. J. HUSAR, Primary Examiner